United States Patent
Fink et al.

(10) Patent No.: US 7,445,103 B2
(45) Date of Patent: Nov. 4, 2008

(54) SYNCHRONIZER CLUTCH FOR A MOTOR VEHICLE MULTISTEP TRANSMISSION

(75) Inventors: Stefan Fink, Oberstenfeld (DE); Alexander Hink, Flein (DE); Joern Pfannschmidt, Ludwigsburg (DE)

(73) Assignee: GETRAG Getriebe-und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 0 days.

(21) Appl. No.: 11/374,408

(22) Filed: Mar. 13, 2006

(65) Prior Publication Data

US 2006/0201268 A1 Sep. 14, 2006

Related U.S. Application Data

(63) Continuation of application No. PCT/EP2004/009465, filed on Aug. 25, 2004.

(30) Foreign Application Priority Data

Sep. 19, 2003 (DE) ................. 103 45 350

(51) Int. Cl.
*F16D 23/06* (2006.01)
(52) U.S. Cl. ................. 192/53.34; 192/113.34
(58) Field of Classification Search ............... 192/53.34
See application file for complete search history.

(56) References Cited

U.S. PATENT DOCUMENTS 4,209,086 A * 6/1980 Friedrich ................. 192/53.34
5,038,628 A * 8/1991 Kayama ...................... 74/339
5,076,882 A * 12/1991 Oyanagi et al. ............. 156/500
5,557,980 A * 9/1996 Mastroianni et al. .......... 74/443

FOREIGN PATENT DOCUMENTS

| DE | 195 42 735 A1 | 11/1995 |
| DE | 197 19 618 A1 | 5/1997 |
| DE | 199 82 494 C1 | 9/1999 |
| DE | 100 36 087 | 7/2000 |
| DE | 100 63 053 A1 | 12/2000 |
| JP | 6228243 | 11/1987 |
| JP | 07063250 | 3/1995 |

OTHER PUBLICATIONS

International Preliminary Report on Patentability dated Aug. 31, 2006.

* cited by examiner

*Primary Examiner*—Richard M. Lorence
(74) *Attorney, Agent, or Firm*—Knobbe Martens Olsen & Bear LLP

(57) ABSTRACT

A synchronizer clutch for a motor vehicle multistep transmission, having a guide sleeve which is fixedly arranged on a shaft, and a synchronizer ring which is mounted so as to be moveable relative to the guide sleeve. The guide sleeve has an axial contact face which an axial face of the synchronizer ring can abut against when the latter is in a rest position. At least one of the axial contact face and the axial face has at least one depression which is not significant in terms of the general function of the synchronizer clutch, but reduces the contact area between the axial contact face and the axial face in the rest position. Thus, when the synchronizer ring moves axially away from the guide sleeve, there is essentially no adhesion on account of lubricating oil.

5 Claims, 2 Drawing Sheets

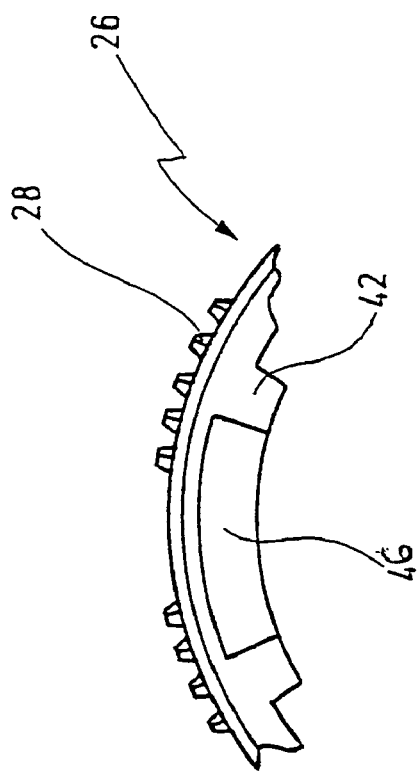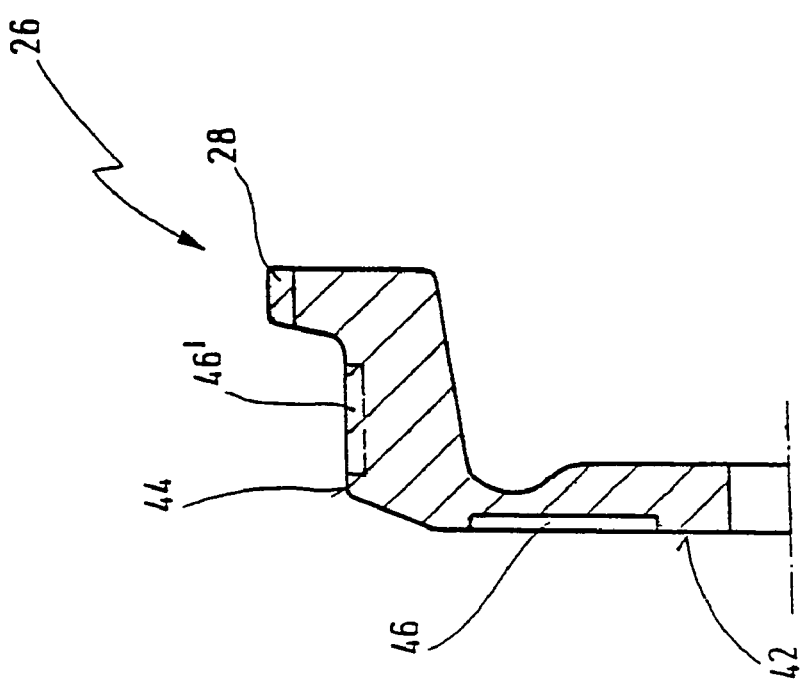

SYNCHRONIZER CLUTCH FOR A MOTOR VEHICLE MULTISTEP TRANSMISSION

CROSS-REFERENCE TO RELATED APPLICATIONS

This application is a continuation of PCT/EP2004/009465 filed Aug. 25, 2004.

BACKGROUND OF THE INVENTION

1. Field of the Invention

The present invention relates to a synchronizer clutch for a motor vehicle multistep transmission, having a guide sleeve which is fixedly arranged on a shaft, and a synchronizer ring which is mounted so as to be moveable relative to the guide sleeve.

2. Description of the Related Art

Synchronizer clutches of this type are used to connect a loose wheel, which is rotatably mounted on a shaft, to the shaft in a positive manner by means of shift gear toothing, and to disconnect this connection again.

Such arrangements are used in motor vehicle multistep transmissions which are embodied as countershaft transmissions. The motor vehicle multistep transmission in this case has a plurality of wheel sets which each comprise a fixed wheel and a loose wheel. The wheel sets are in constant rotational engagement. Different transmission ratios are established in the motor vehicle multistep transmission depending on which loose wheel of the various wheel sets is connected in a rotationally fixed manner to the assigned shaft.

Compared to simple positive shift clutches (such as claw clutches), synchronizer clutches have the distinctive feature that means are provided in order to match the rotational speeds of the loose wheel and the shaft to one another before the positive connection is generated. So-called locking synchronizer clutches are additionally set up such that the positive connection can only be established when the rotational speeds are substantially matched to one another.

Synchronizer clutches generally have a shift sleeve or sliding sleeve which is mounted on the guide sleeve so as to be axially displaceable and which has an inner shift gear toothing. A clutch body, which has an outer shift gear toothing, is normally fixedly arranged on the loose wheel. The positive connection is established by moving the sliding sleeve over the clutch body by virtue of the fact that the shift gear toothings engage in one another.

For the purposes of rotational speed synchronization, a conical friction face is provided on the clutch body. In a corresponding manner, a corresponding conical friction face is provided on the synchronizer ring which is mounted so as to be axially displaceable between the guide sleeve and the clutch body.

The synchronizer ring is moved axially away from the guide sleeve by displacing the sliding sleeve, so that the friction faces come into contact with one another and the rotational speeds are consequently matched.

In the case of locking synchronizer clutches, the synchronizer ring is provided with an outer locking gear toothing. In this case, the synchronizer ring is generally mounted so as to be rotatable to a limited extent with respect to the guide sleeve. Until the rotational speeds have been matched during a shift operation, the synchronizer ring is rotated relative to the inner shift gear toothing of the sliding sleeve on account of the frictional contact with the clutch body, so that it is not possible to shift through.

Only when the rotational speeds of the shaft and the loose wheel are at least substantially matched to one another can the synchronizer ring be rotated, by the shift force, back into a position in which it is possible to shift through.

When a shift operation is initiated, the synchronizer ring is centered on the friction cone of the clutch body and for this purpose moved away from the guide sleeve in the axial direction. The pre-synchronizing force required for this purpose is applied to the synchronizer ring by special pre-synchronizing devices. The magnitude of the pre-synchronizing force is limited. In the case of manual shift transmissions, the magnitude of the pre-synchronizing force is also a determining parameter in the comfort of the shift operation.

It has now been shown that when the transmission is cold, the shift force applied by the driver is not utilized completely for the build-up of the pre-synchronizing force which is required for applying the frictional torque to the conical friction faces. Above certain shift speeds, this inevitably leads to failure of the presynchronization and thus also to a failure of synchronization, which is represented by a crunching or scraping sound when shifting in a transmission which is not yet at operating temperature.

SUMMARY OF THE INVENTION

It is therefore an object of the present invention to specify an improved synchronizer clutch for a motor vehicle multistep transmission with which the "cold crunching" can be improved.

This object is achieved by means of a synchronizer clutch for a motor vehicle multistep transmission, having a guide sleeve which is fixedly arranged on a shaft, and a synchronizer ring which is mounted so as to be moveable relative to the guide sleeve, the guide sleeve having an axial contact face which an axial face of the synchronizer ring can abut against when the latter is in a rest position, at least one of the axial contact face and the axial face having at least one depression which is not significant in terms of the general function of the synchronizer clutch, but reduces the contact area between the axial contact face and the axial face in the rest position so that, when the synchronizer ring moves axially away from the guide sleeve, there is reduced or even essentially no adhesion on account of lubricating oil.

In addition, the above object is achieved by a synchronizer clutch for a motor vehicle multistep transmission, having a guide sleeve which is fixedly arranged on a shaft, and a synchronizer ring which is mounted so as to be moveable relative to the guide sleeve, the guide sleeve having a radial guide face which guides a radial face of the synchronizer ring, at least one of the radial guide face and the radial face having at least one depression which is not significant in terms of the general function of the synchronizer clutch, but reduces the contact area between the radial guide face and the radial face so that, when the synchronizer ring moves relative to the guide sleeve, there is reduced or even essentially no adhesion on account of lubricating oil.

The invention is based on the realization that the high viscosity of some lubricating oils can lead to a more or less pronounced adhesive effect between the synchronizer ring and the guide sleeve when the shift process is initiated, in particular at low temperatures and when there is little play between these two components. This in turn reduces the pre-synchronizing force required for applying the frictional torque and can thus lead, in particular above certain shift speeds, to a failure of presynchronization and thus also to a failure of synchronization, which is represented by a crunching sound.

The adhesive effect is preferably be considerably reduced, while maintaining all other geometric proportions, by virtue of the fact that the mutually facing faces of the synchronizer ring and the guide sleeve are provided with at least one depression or contouring.

The at least one depression or contouring fulfills the purpose of area reduction and thus assists a free flow of at least one of lubricating oil and air into the space vacated between the synchronizer ring and the guide sleeve as the synchronizer ring moves.

The depression or contouring can be formed either on the synchronizer ring and on the guide sleeve or on both and fulfills no other function than the effect described above. The depression or contouring can be of virtually any shape. It can for example be obtained by means of recessed faces, grooves, shoulders, bosses, channels, bores etc. A large reduction in the adhesive effect between the two components is obtained even at low contouring depths.

By reducing the adhesive effect or sticking force, the applied shift force can be converted almost completely into a pre-synchronizing force. The service life of the shift gear toothings and that of the locking gear toothings are increased overall by means of this measure.

In addition, and if appropriate, oil of a lower viscosity can be used.

The space between the guide sleeve and the synchronizer ring can also be reduced. The function of the synchronizer ring is also ensured at relatively low temperatures. Furthermore, the function of the synchronizer ring is also ensured at relatively high shift speeds.

As a result, the object is achieved in its entirety.

It is particularly advantageous if the contact face is reduced in size by at least 30%, in particular by at least 50%, in relation to a contact area without depressions or contourings.

The adhesive effect is reliably reduced as a result of this.

It is also advantageous if the depression has a depth of at least 0.1 mm, and preferably of no more than 1.0 mm, in relation to the contact face.

It has become apparent that even very low depths are sufficient to considerably reduce the adhesive effect. The comparatively low depth of the depressions can additionally ensure the stability of the respective component and its strength.

According to a further embodiment which is preferred overall, the contact face has, on account of the depression or contouring, no continuous face sections with a longitudinal or transverse extent of greater than 2 mm.

The adhesive effect can be considerably reduced by forming the depression or contouring such that relatively large contact face sections with an area of greater than approximately 4 mm$^2$ are avoided.

It is also advantageous if a multiplicity of depressions is provided, so that the previously continuous contact face can be divided into a multiplicity of relatively small contact face sections in order to considerably reduce the adhesive effect.

It is self-evident that the features mentioned above and the features still to be explained can be used not only in the respectively specified combination but also in other combinations or individually without departing from the scope of the present invention.

BRIEF DESCRIPTION OF THE DRAWINGS

Exemplary embodiments of the invention are illustrated in the drawing and are described in more detail in the following description. In the drawing:

FIG. 2 shows a schematic longitudinal section through a synchronizer ring according to the invention; and FIG. 3 shows a plan view of the rear side of a synchronizer ring according to the invention.

DETAILED DESCRIPTION OF THE INVENTION

Figure 1:
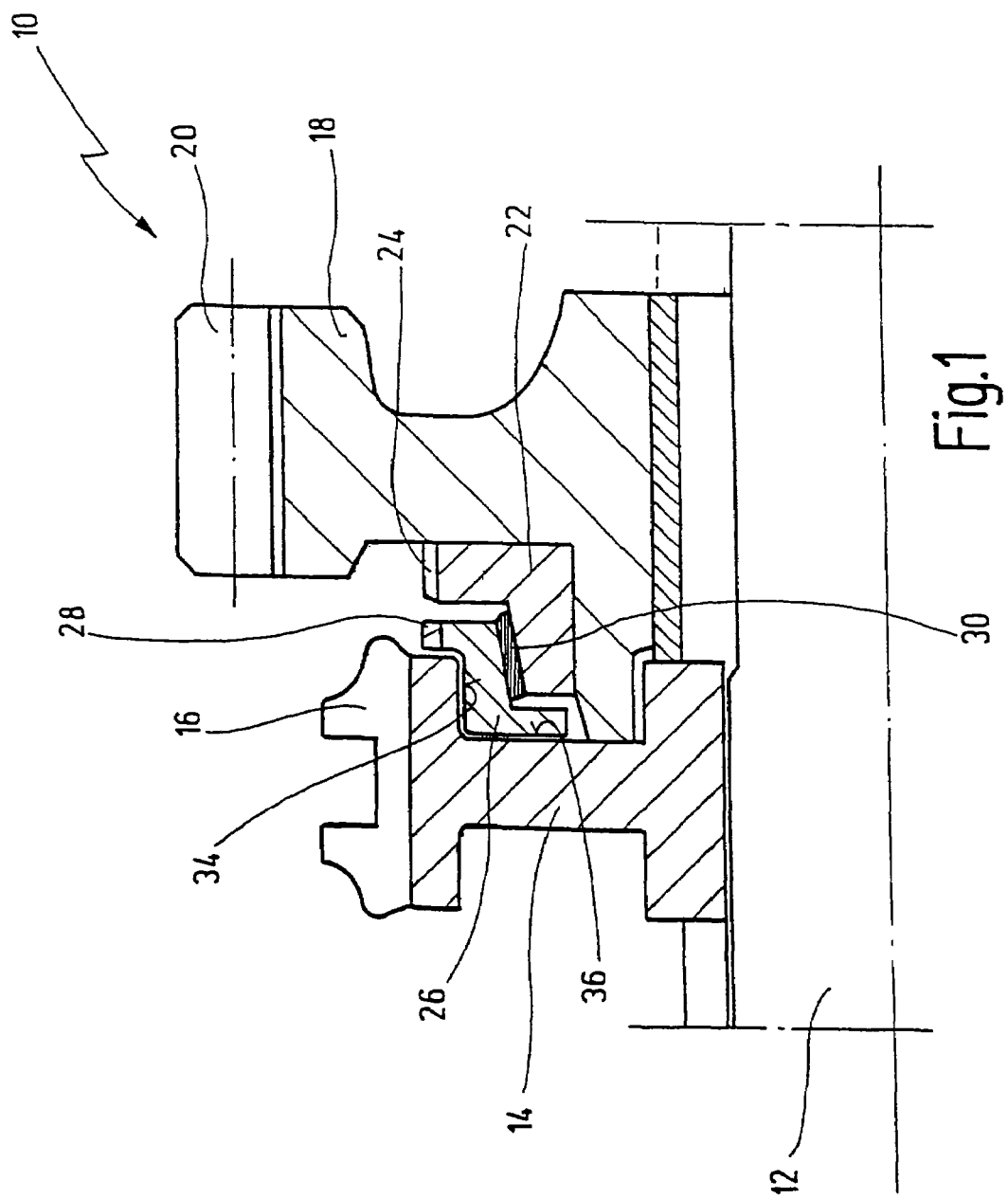
FIG. 1 shows a schematic longitudinal section through a synchronizer clutch according to the invention.

In FIG. 1, a synchronizer clutch for a motor vehicle multistep transmission is denoted generally by 10 in a schematic illustration.

The synchronizer clutch 10 is mounted on a shaft 12. A guide sleeve 14 of the synchronizer clutch 10 is fixedly arranged both in the axial and rotational directions on the shaft 12.

A sliding sleeve 16 is mounted on the guide sleeve 14 so as to be axially moveable. The sliding sleeve 16 has an inner shift gear toothing which is not illustrated in more detail in FIG. 1. The sliding sleeve 16 also has an outer circumferential groove in which a shift fork or similar can engage to displace the sliding sleeve 16.

The synchronizer clutch 10 serves to connect a gear wheel 18 (loose wheel), which is generally rotatably mounted on the shaft 12 and has an outer gear toothing 20, to the shaft 12 in a positive manner, and to disconnect this connection again.

For this purpose, the synchronizer clutch 10 comprises a clutch body 22 which is fixedly connected to the gear wheel 18 and has an outer shift gear toothing 24.

When the sliding sleeve 16 is displaced in the direction of the clutch body 22, their shift gear toothings engage in one another in order to connect the shaft 12 and the gear wheel 18 to one another in a rotationally fixed manner.

For the purpose of matching the rotational speeds of the shaft 12 and the gear wheel 18 before the positive connection is established, a synchronizer ring 26 is provided which is generally mounted between the guide sleeve 14 and the clutch body 22.

The synchronizer ring 26 has a locking gear toothing 28 on its outer circumference and is provided on its inner circumference with a conical friction face which forms a friction pairing 30 with a corresponding conical friction face of the clutch body 22.

The general design of such synchronizer clutches 10 as described above is generally known. Instead of an individual friction pairing, synchronizer clutches with a plurality of friction pairings (for example dual or multi-cone synchronizer clutches) are also known.

The guide sleeve 14 is often denoted in literature as a synchronizer body.

The guide sleeve 14 has a radial guide face 34 and an axial contact face 36.

In a corresponding manner, as shown in FIG. 2, the synchronizer ring 26 has a rear axial face 42, which can abut against the axial contact face 36, and an outer radial face 44, which is guided by the radial guide face 34.

The synchronizer ring 26 is generally in a rest position, that is to say when the synchronizer clutch 10 is not being operated, mounted such that it is freely moveable both in the axial and radial directions within the region it occupies which is defined substantially by the faces of the guide sleeve 14, that is to say the radial guide face 34 and the axial contact face 36.

In other embodiments, the synchronizer ring can also have a conical face at the outer circumference, and the guide sleeve 14 can have a corresponding conical contact face or guide face.

The faces can be of either straight or curved form.

As shown in FIGS. 2 and 3, the synchronizer ring 26 is provided with a plurality of circumferentially distributed, respectively planar depressions 46 on its rear axial face 42. Only one of the plurality of circumferentially distributed depressions 46 is illustrated in each of FIGS. 2 and 3.

The depressions 46 reduce in size the contact area between the axial contact face 36 and the rear axial face 42. Adhesive effects, which can conventionally occur on account of the large area of contact between these two faces, are reduced as a result. As a result, shift forces can be converted largely directly into the required pre-synchronizing forces.

It is preferred that corresponding depressions 46 can be provided in an alternative or cumulative manner on the axial contact face 36, although this is not illustrated in more detail in the figures.

It is preferred, on account of the depressions 46, that the contact faces have no continuous face sections which have a relatively large planar extent, for example no face sections which have a longitudinal or transverse extent of more than 2 mm.

FIG. 2 additionally illustrates that a depression or a plurality of depressions 46' can also be provided on the outer radial face 44. Such radial depressions can also reduce the adhesive effects. In this case, it is self-evident that corresponding radial depressions can also be formed in an alternative or cumulative manner on the radial guide face 34.

It is also preferred that instead of planar depressions (that is to say recessed faces), a reduction in size of the contact area can also be obtained by means of other types of contouring of at least one of the faces 34, 36, 42 and 44, for example by means of grooves, shoulders, bosses, channels, bores etc.

The depth of the depressions or contourings can be relatively low so as not to decrease the strength of the components concerned, for example in the region of at least 0.1 mm, and preferably no more than 1.0 mm.

The contact area is generally reduced in size by the depressions 46, 46' or contourings by at least 30%, in particular by at least 50%, compared to a contact area without such depressions/contourings.

The total area of depression is preferably between 30% to 50% of the respective contact area.

What is claimed is:

1. A synchronizer clutch for a motor vehicle multistep transmission, having a guide sleeve which is fixedly arranged on a shaft, and a synchronizer ring which is mounted so as to be moveable relative to the guide sleeve, the guide sleeve having an axial contact face which an axial face of the synchronizer ring abuts against when the latter is in a rest position, the axial contact face and the axial face defining a contact area on each of the guide sleeve and the synchronizer ring where a surface portion of the guide sleeve and a surface portion of the synchronizer ring are separated only by a thin layer of lubricating oil when the synchronizer ring is in the rest position, wherein the contact area on at least one of the axial contact face and the axial face at least partially surrounds one or more depressions formed therein, wherein said one or more depressions have a total area at the face sufficient to reduce adhesion produced by the thin layer of lubricating oil separating the axial contact face and the axial face of the guide sleeve and the synchronizer ring.

2. The synchronizer clutch as claimed in claim 1, in which the contact area is reduced in size by at least 30% compared to a contact area without depressions.

3. The synchronizer clutch as claimed in claim 1, in which said one or more depressions each have a depth of between 0.1 mm and 1.0 mm.

4. The synchronizer clutch as claimed in claim 1, in which the contact area has, on account of the depression, no continuous sections with a longitudinal or transverse extent of greater than 2 mm.

5. The synchronizer clutch as claimed in claim 1, in which a multiplicity of depressions is provided.

* * * * *